(12) United States Patent
Joyce et al.

(10) Patent No.: US 11,977,632 B2
(45) Date of Patent: May 7, 2024

(54) EVALUATING AUTOMATIC MALWARE CLASSIFIERS IN THE ABSENCE OF REFERENCE LABELS

(71) Applicant: Booz Allen Hamilton Inc., McLean, VA (US)

(72) Inventors: Robert J. Joyce, Odenton, MD (US); Edward Raff, Columbia, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 213 days.

(21) Appl. No.: 17/238,248

(22) Filed: Apr. 23, 2021

(65) Prior Publication Data
US 2022/0366043 A1 Nov. 17, 2022

Related U.S. Application Data

(60) Provisional application No. 63/014,420, filed on Apr. 23, 2020.

(51) Int. Cl.
*G06F 21/56* (2013.01)
*G06F 18/23* (2023.01)
*G06F 18/2431* (2023.01)

(52) U.S. Cl.
CPC ............ *G06F 21/564* (2013.01); *G06F 18/23* (2023.01); *G06F 18/2431* (2023.01)

(58) Field of Classification Search
CPC .... G06F 21/564; G06F 18/23; G06F 18/2431; G06F 21/56
See application file for complete search history.

(56) References Cited

U.S. PATENT DOCUMENTS

| | | | |
|---|---|---|---|
| 2011/0150323 A1* | 6/2011 | Hancock | G06F 18/254 382/224 |
| 2017/0262633 A1* | 9/2017 | Miserendino | G06N 5/025 |
| 2018/0013681 A1* | 1/2018 | Kohout | G06F 16/24578 |
| 2018/0121652 A1* | 5/2018 | Wang | G06F 21/567 |
| 2020/0302223 A1* | 9/2020 | Dutta | G06F 16/907 |
| 2021/0089879 A1* | 3/2021 | Shukla | G06T 3/40 |
| 2021/0256127 A1* | 8/2021 | Miserendino | G06F 21/56 |
| 2021/0342447 A1* | 11/2021 | Sanzgiri | H04L 63/1441 |

FOREIGN PATENT DOCUMENTS

| | | | | |
|---|---|---|---|---|
| CA | 3108525 A1 * | 2/2020 | | G06F 17/18 |
| CN | 110070141 A * | 7/2019 | | G06K 9/6256 |
| EP | 2182458 A1 * | 5/2010 | | G06F 21/562 |

* cited by examiner

*Primary Examiner* — Jayesh M Jhaveri
(74) *Attorney, Agent, or Firm* — BUCHANAN INGERSOLL & ROONEY PC (57) ABSTRACT

Disclosed are methods and apparatuses for classifier evaluation. The evaluation involves constructing a ground truth refinement having a degree of error within specified bounds from a malware reference dataset as an approximate ground truth refinement. The evaluation further involves using the approximate ground truth refinement to determine at least one of: a lower bound on precision or an upper bound on recall and accuracy. The evaluation further involves evaluating a classifier by evaluating at least one of a classification method or clustering method by examining changes to the upper bound and/or the lower bound produced by the approximate ground truth refinement.

17 Claims, 3 Drawing Sheets

EVALUATING AUTOMATIC MALWARE CLASSIFIERS IN THE ABSENCE OF REFERENCE LABELS

CROSS-REFERENCE TO RELATED APPLICATIONS

This application is related to and claims the benefit of U.S. Provisional Application No. 63/014,420, filed on Apr. 23, 2020, the entire contents of which is incorporated by reference.

FIELD

Embodiments related to apparatuses and methods for evaluating classifier methods of data classification by examining changes to upper and/or lower bounds produced by an approximate ground truth refinement construct.

BACKGROUND INFORMATION

The capabilities of a new clustering algorithm, data classification algorithm, or classifier (hereinafter, individually each a classifier model, and collectively classifier models) must be assessed both during and after development. Various methods and metrics are used to evaluate these capabilities so that an end user can make an informed choice about the accuracy of a classifier model to assess its suitability for the user's needs (the methods and metrics hereinafter, an evaluator). A reference dataset is required for computing these metrics. Each data point in a reference dataset has a reference label, which is the correct label that a classifier is expected to predict. When evaluating a clustering algorithm, a dataset clustered by reference label is typically referred to as a reference clustering. However, not all reference datasets are equally fit for an evaluator. As will be discussed herein, reference datasets can be too small, lack diversity, or have an imbalanced class distribution. In some fields, it is not feasible to obtain ground truth reference labels for a large dataset, and therefore small reference datasets or datasets with lower quality reference labels are used in their stead. Using reference datasets that have these deficiencies may produce inaccurate or misleading evaluator results [1]. However, when a field has no satisfactory reference datasets, how can one trust evaluator results? This problem can make it difficult to determine which (if any) classifier model is most suitable for a task, or if progress is being made while developing a classifier model.

The disclosed apparatuses and methods provide an improvement to these undesirable circumstances by introducing a provable framework for an evaluator to assess the accuracy of classifier models where reference datasets lack reference labels.

SUMMARY

In an exemplary embodiment, a method for classifier evaluation involves constructing a ground truth refinement having a degree of error within specified bounds from a reference malware dataset as an approximate ground truth refinement. The method involves determining at least one of: a lower bound on precision using the approximate ground truth refinement; or an upper bound on recall and accuracy using the approximate ground truth refinement. The method involves evaluating a classifier for at least one task of a classification method or a clustering method by examining changes to the at least of one of the upper bound or the lower bound produced by the approximate ground truth refinement.

In an exemplary embodiment, a method for classifier evaluation involves constructing a ground truth refinement having a degree of error within specified bounds from a reference malware dataset as an approximate ground truth refinement. The method involves determining at least one of: a lower bound on precision and using the approximate ground truth refinement; or an upper bound on recall and accuracy using the approximate ground truth refinement. The method involves refining predictions of at least one of the classifier method or the clustering method using the ground truth refinement to improve accuracy, precision, and/or recall.

In an exemplary embodiment, a method for improving a classifier for an input data file involves constructing a ground truth refinement having a degree of error within specified bounds from a malware reference dataset as an approximate ground truth refinement. The method involves determining at least one of: a lower bound on precision using the approximate ground truth refinement; or an upper bound on recall and accuracy using the approximate ground truth refinement. The method involves evaluating the classifier for at least one task of a classification method or clustering method by examining changes to the at least one of the upper bound or the lower bound produced by the approximate ground truth refinement. The method involves classifying the input data file as malware using the classifier evaluated by the approximate ground truth refinement having at least one of the upper bound or the lower bound. The method involves at least one of: altering parameters of the at least one of the classification method or clustering method used by the classifier; or refining predictions of the at least one of the classification method or the clustering method used by the classifier.

In an exemplary embodiment, an apparatus for evaluating a classifier includes a classifier for classifying an input data file. The apparatus includes a processor for evaluating the classifier, wherein the processor includes a computer program which when executed will cause the processor to: construct a ground truth refinement having a degree of error within specified bounds from a malware reference dataset as an approximate ground truth refinement; determine at least one of: a lower bound on precision using the approximate ground truth refinement; or an upper bound on recall and accuracy using the approximate ground truth refinement; and evaluate the classifier for at least one task of a classification method or a clustering method by examining changes to that at least one of the upper bound or the lower bound produced by the approximate ground truth refinement.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

In some problem spaces the high cost or challenges of obtaining ground truth labels necessitates use of lower quality or smaller reference datasets. It is difficult to properly evaluate or compare classifier models using these datasets, as evaluation results may be misleading or biased. The evaluators disclosed herein are methods for assessing the accuracy of classifier models without the need for reference datasets with reference labels. This method is referred to herein as approximate ground truth refinement (AGTR). The AGTR of a dataset is a (potentially incomplete) sub-graph of ground truth reference labels where links in the AGTR indicate a positive relationship, but the absence of a link does not imply the absence of a relationship. Using an AGTR, bounds on precision, recall, and accuracy of a clustering algorithm or a multiclass classifier can be computed without reference labels.

With the AGTR, embodiments disclosed herein relate to evaluators that assess the accuracy by which the classifier model classifies data. Once evaluated, a user will have a measure of the classifier model's accuracy and therefore a corresponding confidence (or lack of confidence) in the classifier model's classification results. For instance, the evaluator can assess how accurately (within which bounds of accuracy) a classifier model can operate. Armed with this knowledge, a user can then apply the classifier model to a particular application. Use of AGTRs can span across any application, i.e., it can be used for any reference dataset for which data points can be grouped with high precision, but obtaining adequate reference labels for the data points is difficult. Thus, while exemplary classification model applications described herein may pertain to malware classification and clustering techniques, the evaluators are not intended to be limited to such classification model applications. For instance, other classification model applications can include disease classification, e.g., embodiments can evaluate the accuracy of a disease identification application (a classifier model) in detecting and/or identifying diseases.

With respect to malware classifiers, creating an AGTR requires robust domain knowledge. The disclosure provides an example of the effectiveness of the AGTR evaluation framework by applying it to a popular malware labeling tool to diagnose over-fitting in prior testing and evaluate changes that could not be validated under previous data.

Figure 1:
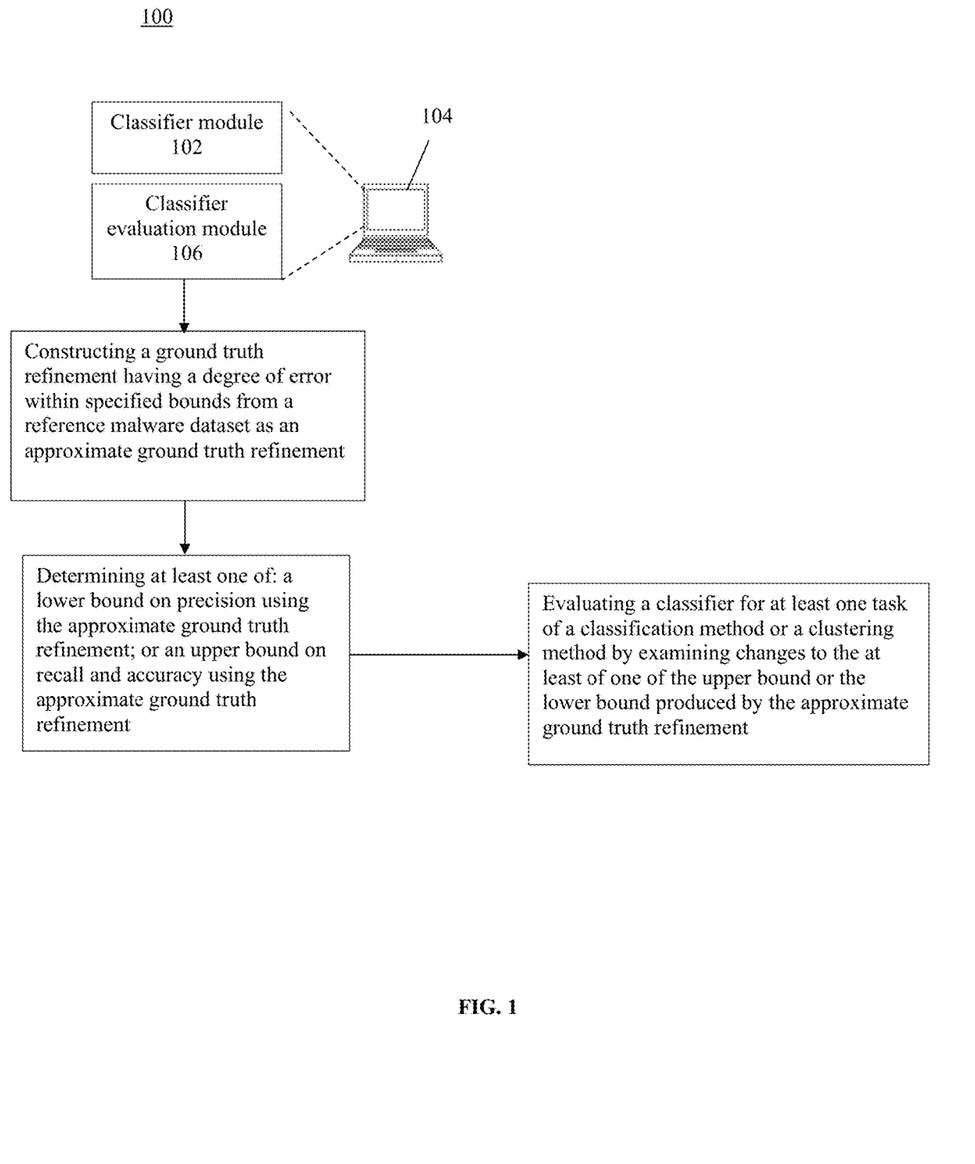
FIG. 1 shows an exemplary evaluator apparatus configuration for assessing a classifier model.

Referring to FIG. 1, during a cyber incident (e.g., cyberattack), it is common for analysts to perform three functions: 1) detection (determine if the file is malicious); 2) classification (identify a family of malicious files, if any, from which the malicious file is derived); and 3) attribution (identifying the malicious actors responsible for the attack). Embodiments disclosed herein focus on assessing the accuracy of classifier models 102. A common objective of classifier models is identifying to which family of malware a sample of malware may belong. Members of a malware family tend to have similar goals and perform similar functions, and thus classification can be an essential part of analysis, remediation, and triage.

A malware family can be a collection of malicious files that are derived from a common source code. Ideally a malware reference dataset would be constructed using manual labeling to recognize the malware family of each malicious file. Manual analysis is not perfectly accurate, but the error rate is considered sufficiently negligible to provide ground truth confidence [7]. A professional analyst can take 10 hours or more to fully analyze a single malicious file [8, 9]. Although human analysis does not always entail this level of effort, it demonstrates the typical high cost of manual labeling of datasets with respect to all but very small reference datasets [1]. Due to the high cost, time, and effort associated with manual labeling, it is common for malware reference labels to be obtained via automated or semi-automated means. These labels are of lower quality than manually-generated ground truth labels, and their use can lead to biased or misleading evaluation metric values.

The evaluator apparatuses and methods disclosed herein provide a means to assess the precision, recall, and/or accuracy of classifier models 102, such as malware classifiers, without having to use reference labels. This can be achieved by constructing an approximate ground truth refinement from a reference dataset. With this, lower bounds on precision as well as upper bounds on recall and accuracy can be generated without requiring ground truth reference labels. This framework can then be used as a classifier evaluation module 106 to evaluate classifier modules 102 and associated algorithms.

Embodiments can include a processor 104 configured to implement the evaluators and techniques disclosed herein. For instance, the processor 104 can be configured as an embodiment of the classifier evaluation module 106. The processor 104 can be a stand-alone device that operates on another device (e.g., another processor or computer device), the other device being configured as a classifier module 102. In the alternative, the processor 104 can be configured as the classifier module 102 and include an operating module that is the classifier evaluation module 106. For instance, the processor 104 can include a classifier evaluation module 106 configured to evaluate a classifier module 102. The classifier module 102 can be associated with the processor 104 or be associated with a different processor. The classifier module 102 and/or the classifier evaluation module 106 can be embodied as software and stored in memory, the memory being operatively associated with the processor 104.

Any of the processors discussed herein can be hardware (e.g., processor, integrated circuit, central processing unit, microprocessor, core processor, computer device, etc.), firmware, software, etc. configured to perform operations by execution of instructions embodied in algorithms, data processing program logic, automated reasoning program logic, etc. It should be noted that use of processors herein includes Graphics Processing Units (GPUs), Field Programmable Gate Arrays (FPGAs), Central Processing Units (CPUs), etc. Any of the memory discussed herein can be computer readable memory configured to store data. The memory can include a non-volatile, non-transitory memory (e.g., as a Random Access Memory (RAM)), and be embodied as an in-memory, an active memory, a cloud memory, etc. Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach for controlled and coordinated signal transmission and processing to any other component or combination of components of the communication system. The transmission can be via a communication link. The communication link can be electronic-based, optical-based, opto-electronic-based, quantum-based, etc.

As will be explained in more detail herein, a GTR (defined below) is a theoretical framework for the classifier module 102. Using a GTR, it is possible to compute bounds for metrics commonly used to evaluate automatic malware classifier modules 102 without the need for reference labels. In practice, construction of a GTR incurs a small number of errors, which we call an AGTR. The bounds on these evaluation metrics can still be proven using an AGTR, provided that errors in the AGTR construction process are accounted for correctly.

The terminology relevant to the definition of a GTR is as follows. For a dataset M, let C and D each partition M, where C is a predicted clustering of the M, and D is a reference clustering. If R refines D, and D has ground truth confidence, then R is a GTR. The utility of a GTR is demonstrated when computing metrics such as precision and recall, because it is not necessary to know the exact reference label of any data point, but rather it is sufficient to know that all samples in a cluster have the same reference label. If R can be obtained without knowing D, information relevant to the computation of various evaluator metrics is revealed, and later we show that this information can be useful for other computations such as computing bounds on precision, recall, and accuracy.

Unfortunately, it is impossible to confirm whether a clustering is a GTR without knowing the ground truth reference clustering. When attempting to construct a GTR, we assume that the resulting clustering is very similar to a GTR but has a small number e of data points that violate the properties of a refinement. We call such a clustering an approximate ground truth refinement (AGTR) and denote it $R^{\wedge}$.

When generating an AGTR, some embodiments can involve high-precision clustering (i.e., grouping unrelated data points as infrequently as possible). When constructing an AGTR from a dataset of malware samples, some embodiments can involve using metadata hashing to perform the high-precision clustering. This process can involve computing a metadata hash digest for each malware sample in the dataset. To compute a metadata hash digest for a malware sample, certain metadata fields, such as those from a Portable Executable (PE) header data structure or an Import Address Table of a file structure, can be selected and parsed from the sample and used as input to a cryptographic hash function. This cryptographic hash function can output a metadata hash digest for that malware sample. Assuming that no collisions occur in the hash function, two malware samples that share the same metadata hash must have identical values for the metadata fields that were selected and used as input. A database can be indexed on metadata hash digests for efficient querying of similar malware samples. To construct an AGTR from a dataset of malware samples using metadata hashing, all malware samples that share a metadata hash are assigned to the same cluster. Malware samples for which a metadata hash cannot be computed are assigned to a singleton cluster. Other high-precision clustering approaches for constructing an AGTR from a dataset of malware samples can involve use of density-based clustering to identify groups of malware samples that are in close proximity to each other.

These processes can be used to generate an AGTR. The AGTR can then be used in a classifier evaluation module 106 to assess the accuracy of a classifier module 102. The assessment can involve evaluating classification and/or clustering methods performed by the classifier module 102 by examining changes to the upper bound and/or lower bound produced by the AGTR.

In an exemplary embodiment, an evaluator can involve constructing a ground truth refinement having a degree of error within specified bounds with respect to a malware reference dataset as an approximate ground truth refinement. The method can involve determining at least one of: a lower bound on precision using the approximate ground truth refinement; or an upper bound on recall and accuracy using the approximate ground truth refinement. The method can involve assessing a classifier module 102 for a classification method and/or a clustering method by examining changes to the upper bound and/or the lower bound produced by the approximate ground truth refinement.

Some evaluator embodiments can involve altering parameters of a classification method and/or a clustering method of the classifier module 102 by examining changes to the upper bound and/or the lower bound produced by the approximate ground truth refinement.

Some evaluator embodiments can involve refining predictions of a classifier method and/or a clustering method of the classifier module 102 using the ground truth refinement to improve accuracy, precision, and/or recall of the classifier method and/or the clustering method.

Some evaluator embodiments can involve detecting biased or misleading evaluation results from a classifier method and/or a clustering method.

Some evaluator embodiments can involve computing a metadata hash digest of at least one malware dataset sample. The method can involve assigning two malware dataset samples that share a metadata hash digest to a sample cluster. The method can involve assigning a malware sample for which the metadata hash digest cannot be computed to a singleton cluster.

In some embodiments, the metadata hash is a peHash.

Some embodiments can involve a method of classifying an input data file as malware using a classifier module 102 evaluated by the approximate ground truth refinement having at least one of the upper bound or the lower bound.

Some embodiments can involve a method of classifying the malware as being within a known family of malware using the classifier module 102 evaluated by the approximate ground truth refinement having at least one of the upper bound or the lower bound.

Some embodiments relate to an apparatus 100 for evaluating a classifier module 102. The apparatus 100 can include a classifier module 102 configured for classifying an input data file. The apparatus 100 can include a processor 104 for evaluating the classifier module 102, wherein the processor 104 includes a computer program which, when executed, will cause the processor to construct an approximation of a ground truth refinement from a malware reference dataset as an approximate ground truth refinement. The processor 104, when executing the computer program, will determine at least one of: a lower bound on precision using the approximate ground truth refinement; or an upper bound on recall and accuracy using the approximate ground truth refinement. The processor 104, when executing the computer program, will evaluate the classifier module 102 for a classification method and/or a clustering method by examining changes to the upper bound and/or the lower bound produced by the approximate ground truth refinement.

In some embodiments, the execution of the computer program will cause the processor 104 to alter parameters of a classification method and/or a clustering method of the classifier module 102 by examining changes to the upper bound and/or the lower bound produced by the approximate ground truth refinement.

In some embodiments, the execution of the computer program will cause the processor to refine predictions of a classifier method and/or a clustering method of the classifier using the ground truth refinement to improve accuracy, precision, and/or recall of the classifier method and/or the clustering method.

In some embodiments, the classifier module 102 classifies the input data file as malware.

In some embodiments, the classifier module 102 can perform a classification method and/or a clustering method, the classifier module 102 having been evaluated by an embodiment of a classifier evaluation module 106 disclosed herein.

Construction Of An Approximate Ground Truth Refinement (AGTR)

Let M be a dataset consisting of m unique data points. Let $C=\{C_i\}_{1 \le i \le c}$ and $D=\{D_j\}_{1 \le j \le d}$, where C is the predicted clusters of the dataset M and D is the reference clustering. Let $f: \{1 \ldots c\} \mapsto \rightarrow \rightarrow \{1 \ldots d\}$ and $g: \{1 \ldots d\} \mapsto \rightarrow \rightarrow \{1 \ldots c\}$ be functions mapping the predicted labels to the reference labels and vice versa. The label translation functions $f$ and $g$ are defined differently for clustering and classification problems. When evaluating clustering algorithms, no predicted labels exist that can be used to map between clusters in C and D. Instead, $f$ and $g$ are defined as [2]:

$f(i) = \mathrm{argmax}_j |C_i \cap D_j|$ and $g(j) = \mathrm{argmax}_i |C_i \cap D_j|$ These function definitions map each predicted cluster to the reference cluster for which there is maximal overlap and vice versa. When evaluating a classifier model, the set of labels used by the classifier model is typically equivalent to the set of labels used by the reference dataset. In these cases, c=d, and $f$ and $g$ are defined as the identity function [2]:

$\forall i, 1 \le i \le c, f(i)=i$ and $g(i)=i$

When the labels used by the classifier model do not map directly to those used in the reference dataset, either a custom mapping or the function definitions for mapping clusters can be used.

Figure 2:
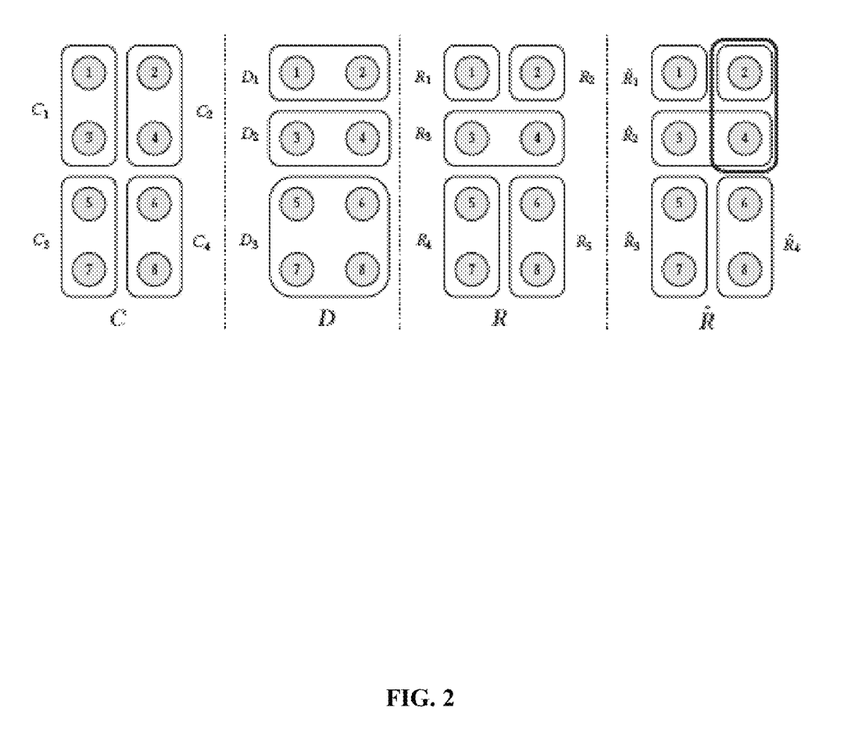
FIG. 2 shows four partitions of a hypothetical reference dataset with eight data points.

FIG. 2 shows four partitions of a hypothetical dataset with eight data points. The predicted clusters (left, "C") would ideally be evaluated using a ground truth reference (GTR) clustering (second from left, "D"). A GTR (second from right, "R") informs a subset of the data point relationships in D (e.g., 5 and 7 ($R_4$) must belong to the same reference cluster, but without D it is unknown whether the members of $R_4$ and $R_5$ belong to the same reference cluster). An AGTR (right, "R^") is a GTR having less than $\epsilon$ errors. $R^{\wedge}_2$ incorrectly groups data point 2 with 3 and 4, so this AGTR has $\epsilon=1$ errors. If data point 2 is removed from $R^{\wedge}_2$, $R^{\wedge}$ becomes a GTR.

This disclosure refers to three metrics used for evaluating clustering algorithms and multiclass classifiers: precision, recall, and accuracy. Historically, precision and recall have been used for evaluating the performance of information retrieval systems [3]. Bayer et al. [4] introduced alternate definitions of precision and recall as cluster validity indexes. Li et al. [2] broadened these definitions to allow for evaluation of multiclass classifiers. Additionally, Li et al. shows that the accuracy of a classifier can be computed as a special case of precision and recall. The following discussion relates to how precision, recall, and accuracy are computed.

$$\text{Precision } (C, D) = \frac{1}{m}\sum_{i=1}^{c}|C_i \cap D_{f(i)}|. \quad \text{DEFINITION 1}$$

When used as a cluster validity index, precision measures how well a clustering separates data points belonging to different reference clusters. In Definition 1, precision penalizes the presence of impure clusters, i.e., clusters containing data points belonging to other reference clusters [2]. A high precision (near 1 (one)) indicates that few clusters are impure while a low precision (near 0 (zero)) indicates that many clusters are impure. Precision tends to increase as the number of predicted clusters increases. The precision of a clustering is 1 (one) if every data point is correctly assigned to a cluster (whether correctly assigned to a singleton cluster or a cluster of more than one data point) because no cluster is impure [4]. In FIG. 2, precision(C, D)=0.75.

$$\text{Recall } (C, D) = \frac{1}{m}\sum_{j=1}^{d}|C_{g(j)} \cap D_j|. \quad \text{DEFINITION 2}$$

Recall measures how well a clustering groups data points belonging to the same reference cluster. In Definition 2, recall penalizes instances in which data points belonging to the same reference cluster do not appear in the same predicted cluster [2]. Contrary to precision, recall tends to increase as the number of predicted clusters decreases, because it is more likely for related data points to be grouped together. The recall of a clustering is 1 (one) if all data points are grouped in a single cluster, because it is impossible for data points with the same reference label to belong to different predicted clusters [4]. In FIG. 2, Recall(C, D)=0.5.

DEFINITION 3. If $f$ and g are the identity function, then Accuracy (C, D)=Precision (C, D)=Recall(C, D).

Accuracy measures how frequently the predicted label matches the reference label. By Definition 3, accuracy, precision, and recall are all equivalent when $f$ and g are the identity functions [2]. Accuracy cannot be computed if there is not a one-to-one mapping between the predicted clusters and the reference clusters, such as in FIG. 2.

The following discussion introduces the concept of a GTR and shows that a GTR can be used to find provable bounds on precision, recall, and accuracy. In practice, when constructing a GTR from a reference dataset it can be assumed that a small number of errors occurs. This disclosure refers to an imperfect GTR as an AGTR. The data and proofs presented herein show that bounds on the evaluation metrics can still be proven using an AGTR if errors in the AGTR construction process are properly accounted for. Consequently, a framework using an AGTR can evaluate clustering algorithms and multiclass classifiers when satisfactory reference data is unavailable.

A key element in this construction is the concept of a set partition refinement. Suppose two partitions R and S are of the same set M. R is a refinement of S if each set within R is a subset of some set in S [5].

DEFINITION 4. If $\forall R_k \in R$, $\exists S_j \in S$ s.t. $R_k \subseteq S_j$ then R is a set partition refinement of S.

Set partition refinements can also be considered from an alternate perspective. If R is a refinement of S, then S can be constructed by iteratively merging sets within R. Specifically, each set $S_j \in S$ is equivalent to the union of some unique set of sets within R.

Property 1

$\forall S_j \in S,$ $\exists ! \, Q_j = \{Q_{j\ell}\}_{1 \leq \ell \leq q_j} s.t. \, S_j = \bigcup_{\ell=1}^{q_j} Q_{j\ell}$ and $\forall \, Q_{j\ell} \in Q_j, Q_{j\ell} \in R.$ A GTR of a dataset is a clustering where all data points in a cluster are members of the same ground truth reference cluster. Importantly, the opposite is not necessarily true, as data points in the same reference cluster can belong to different clusters in the GTR.

DEFINITION 5. If D is a ground truth reference clustering and R is a refinement of D, then R is a ground truth refinement.

Recall that for a dataset M, $C=\{C_i\}_{1 \leq i \leq c}$ is the predicted clustering of the dataset, and $D=\{D_j\}_{1 \leq i \leq d}$ is a reference clustering. Let D have ground truth confidence, and let $R=\{R_k\}_{1 \leq k \leq r}$ be a GTR of D. Since R partitions M, it is possible to compute the precision and recall of C with respect to R rather than D. An important trait of a GTR is that it does not require reference labels. Since R is unlabeled, each predicted cluster in C can be mapped to the cluster in the R for which there is maximal overlap and vice versa. Let the functions for mapping between the predicted clusters and the GTR $f^{\wedge}: \{1 \ldots c\} \mapsto \to \to \{1 \ldots r\}$ and $g^{\wedge}: \{1 \ldots r\} \mapsto \to \to \{1 \ldots c\}$ be defined as: $f^{\wedge}(i) = \mathrm{argmax}_k |C_i \cap R_k|$ and $g^{\wedge}(k) = \mathrm{argmax}_i |C_i \cap R_k|$.

Using Definition 4, the precision of a clustering algorithm or multiclass classifier computed using the ground truth reference clustering is proven to be bounded below by its precision computed using a GTR. Similarly, using Property 1, recall computed using a GTR is proven to be always an upper bound on recall computed using the ground truth reference clustering. Because accuracy, precision, and recall are all equivalent in a special case, it can be proven that recall computed using a GTR is also always an upper bound on the accuracy of a classifier.

Theorem 1. Precision(C, R)≤Precision(C, D)

Proof of Theorem 1. Suppose some i s.t. $1 \leq i \leq c$. Since R is a refinement of D, $\exists D_j \in D$ s.t. $R_{f \cdot (i)} \subseteq D_j$. Because $R_{f \cdot (i)} \subseteq D_j$, it must be that $|C_i \cap R_{f \cdot (i)}| \leq |C_i \cap D_j|$. By definition, (i)=$\mathrm{Argmax}_j |C_i \cap D_j|$. Therefore, $|C_i \cap E_{f \cdot (i)}| \leq |C_i \cap D_j| \leq |C_i \cap D_{f(i)}|$.

A sum over this inequality can be done to obtain:

$$\frac{1}{m} \sum_{i=1}^{c} |C_i \cap R_{f'(i)}| \leq \frac{1}{m} \sum_{i=1}^{c} |C_i \cap D_{f(i)}|$$

By Definition 1, (C, R)≤Precision(C,D).

Theorem 2. Recall(C, R)≥Recall(C, D)

Proof of Theorem 2. Suppose some j s.t. $1 \leq j \leq d$. Because R is a refinement of D, $\exists Q_j = \{Q_j^{\ell}\}_{1 \leq \ell \leq q_j}$ s.t. $Q_{j\ell} \in R$ and $$D_j = \bigcup_{\ell=1}^{Q_j} Q_{j\ell}..$$

It can be said that $$|D_j| = \sum_{\ell=1}^{q_j} |Q_{j\ell}|$$

and furthermore that $$|C_{g(j)} \cap D_j| = \sum_{\ell=1}^{q_j} |C_{g(j)} \cap Q_{j\ell}|.$$

$\forall Q_{j\ell} \in$, $\exists R_k \in R$ s.t. $Q_{j\ell} = Q_k$. By definition $g^{\wedge}(k) = \mathrm{argmax}_i |C_i \cap R_k|$, and $R_k = Q_{j\ell}$, so $|C_{g^{\wedge}(k)} \cap R_k| \geq |C_{g(j)} \cap Q_{j\ell}|$. Since, by Property 1, the sets $R_k$ are in bijection with the sets $Q_{j\ell}$, a sum over this inequality can be done to obtain:

$$\frac{1}{m} \sum_{k=1}^{r} |C_{g'(k)} \cap R_k| \geq \frac{1}{m} \sum_{j=1}^{d} \sum_{\ell=1}^{q_j} |C_{g(j)} \cap Q_{j\ell}|$$

$$\frac{1}{m} \sum_{j=1}^{d} \sum_{\ell=1}^{q_j} |C_{g(j)} \cap Q_{j\ell}| = \frac{1}{m} \sum_{j=1}^{d} |C_{g(j)} \cap D_j|$$

By Definition 2, Recall(C, R)≥Recall(C, D).

Corollary 2.1. Recall(C, R)≥Accuracy(C, D)

Proof of Corollary 2.1. Using Theorem 2, Recall(C, R)≥Recall(C, D). It must be the case that Recall(C, D) where $g(i) = \mathrm{argmax}_j |C_i \cap D_j| \geq \mathrm{Recall}(C, D)$ where g is the identity function. Using Definition 3, Recall(C, D)=Accuracy(C, D) when g is the identity function. Therefore, Recall(C, R)≥Accuracy(C, D).

Unfortunately, it is impossible to confirm whether or not a clustering is a GTR without knowing the ground truth reference clustering. Because it is intended for GTRs to be used when satisfactory reference datasets are not available, this is problematic. When attempting to construct a GTR, it can be assumed that the resulting clustering is very similar to a GTR but has a small number of data points e which violate the properties of a refinement. Such a clustering is referred to herein as an approximate ground truth refinement (AGTR).

DEFINITION 6. If R is a ground truth refinement and R^ can be mad equivalent to R by correcting the cluster membership of $\epsilon$ data points, then R^ is an approximate ground truth refinement.

Suppose an AGTR R^ with e erroneous data points. Even without knowing which data points must be corrected to transform R^into a GTR, bounds on Precision(C, D) as well as upper bounds on Recall(C, D) and Accuracy(C, D) can again be derived using R^ and E. To do this, it is first shown that the precision and recall change in predictable ways when a reference clustering is modified. Let S be an arbitrary partition of a dataset M, and let S^ be identical to S but with a single data point belonging to a different cluster. When the precision and recall of C are measured with respect to S and S^, the metrics share the following relationship:

Theorem 3. |Precision(C, S)−Precision(C, S^)|≤1/m

Proof of Theorem 3. Let $S=\{S_t\}_{1 \leq t \leq s}$ be an arbitrary partition of M. Let the label translation function: $\{1 \ldots c\} \mapsto \to \to +\{1 \ldots s\}$ be defined as $f(i) = \mathrm{argmax}_t |C_i \cap S_t|$. Suppose some $M_n \in M$, some $S_x \in S$ s.t. $M_n \in S_x$, and some $S_y$ s.t. $S_y \in S$ or $S_y = \{\emptyset\}$. Furthermore, suppose some $C_{\alpha'} \in C$ s.t. $M_n \in C_\alpha$ and $b = f(y)$. Let $\hat{S} = \{\hat{S}_{\hat{t}}\}_{1 \leq \hat{t} \leq \hat{s}}$ be a clustering identical to S except for one cluster label change, which is given by $\hat{S}_x = S_x - \{M_n\}$ and $\hat{S}_y = S_y \cup \{M_n\}$.

Let the function $\hat{f}: \{1 \ldots c\} \mapsto \to \to +\{1 \ldots \hat{s}\}$ be defined as $\hat{f}(i) = \mathrm{argmax}_{u^\wedge} |C_i \cap \hat{S}_{u^\wedge}|$.

At minimum $C_\alpha \cap \hat{S}_{\hat{f}(\alpha)} = C_\alpha \cap S_{f(\alpha)} - 1$ and at maximum $\hat{S}_{\hat{f}(\alpha)} = |C_\alpha \cap S_{f(\alpha)}|$. Similarly, at minimum $|Cb \cap \hat{S}_{\hat{f}(b)}| = |C_b \cap S_{f(b)}|$ and at maximum $|Cb \cap \hat{S}_{\hat{f}(b)}| = |C_b \cap S_{f(b)}| + 1$. Finally, because all elements in M are unique and C partitions M, $\forall C_i \in C$ s.t. $i \neq \alpha$ and $i \neq b$, $C_i \cap S_{f(i)} = |C_i \cap \hat{S}_{\hat{f}(i)}|$. Therefore, $$\sum_{t=1}^{s} |C_{g(t)} \cap S_t| - 1 \leq \sum_{\hat{t}=1}^{\hat{s}} |C_{\hat{g}(\hat{t})} \cap \hat{S}_{\hat{t}}| \leq \sum_{t=1}^{s} |C_{g(t)} \cap S_t| + 1.$$

By Definition 1, Precision(C, S)−1/m≤Precision(C, Ŝ)≤Precision(C, S)+1/m. This can be written as |Precision(C, S)−Precision(C, Ŝ)|≤1 m.

Corollary 3.1. |Precision(C, R)−Precision(C, R̂)|≤ϵ/m

Proof of Corollary 3.1. By Theorem 3, |Precision(C, S)−Precision(C, Ŝ)|≤1/m for some arbitrary clustering S and a second clustering Ŝ that is equivalent to S but with a single data point belonging to a different cluster. Given a GTR R and a corresponding AGTR R̂, the cluster membership of ϵ data points can be sequentially changes in R to obtain R̂. At each step the precision value can change by at most ±1/m.

Therefore, |Precision(C, R)−Precision(C, R̂)|≤ϵ/m.

Corollary 3.2. |Precision(C, D)−Precision(C, R̂)|≤δ/m

Proof of Corollary 3.2. By Theorem 3, |Precision(C, S)−Precision(C, Ŝ)|≤1/m for some arbitrary clustering S and a second clustering Ŝ that is equivalent to S but with a single data point belonging to a different cluster. Given a ground truth reference clustering D and a corresponding AGTR R̂, the cluster membership of δ data points can be sequentially changed in D to obtain R̂. At each step, the precision value can change by at most ±1/m. Therefore, |Precision(C, D)−Precision(C, R̂)|≤δ/m.

Theorem 4. |Recall(C, S)−Recall(C, Ŝ)|≤1/m

Proof of Theorem 4. Let $S = \{S_t\}_{1 \leq t \leq s}$ be an arbitrary partition of M. Let the label translation function: $\{1 \ldots s\} \mapsto \to \to \{1 \ldots c\}$ be defined as $g(t) = \mathrm{argmax}_i |C_i \cap S_t|$. Suppose some $M_n \in M$, some $S_x \in S$ s.t. $M_n \in S_x$, and some $S_y$ s.t. $S_y \in S$ or $S_y = \{\emptyset\}$. Let $\hat{S} = \{\hat{S}_{\hat{t}}\}_{1 \leq \hat{t} \leq \hat{s}}$ be a clustering identical to S except for one cluster label change, which is given by $\hat{S}_x = S_x - \{M_n\}$ and $\hat{S}_y = S_y \cup \{M_n\}$.

Let the function $\hat{g}: \{1 \ldots \hat{s}\} \mapsto \to \to \{1 \ldots c\}$ be defined as $\hat{g}(\hat{t}) = \mathrm{argmax}_i |C_i \cap \hat{S}_{\hat{t}}|$. At minimum $|C_{\hat{g}^\wedge(x)} \cap \hat{S}_x| = |C_{g(x)} \cap S_x| - 1$ and at maximum $C_{\hat{g}^\wedge(x)} \cap \hat{S}_x = C_{g(x)} \cap S_x$. Similarly, at minimum $|C_{\hat{g}^\wedge(y)} \cap \hat{S}_y| = |C_{g(y)} \cap S_y|$ and at maximum $C_{\hat{g}^\wedge(y)} \cap \hat{S}_y = |C_{g(y)} \cap S_y| + 1$. Because each other cluster in Ŝ is identical to some cluster in S, $$\sum_{t=1}^{s} |C_{g(t)} \cap S_t| - 1 \leq \sum_{\hat{t}=1}^{\hat{s}} |C_{\hat{g}(\hat{t})} \cap \hat{S}_{\hat{t}}| \leq \sum_{t=1}^{s} |C_{g(t)} \cap S_t| + 1.$$

Using Definition 2, Recall(C, S)−1/m≤Recall(C, Ŝ)≤Recall(C, S)+1/m. This can be written as |Recall(C, S)−Recall(C, Ŝ)|≤1 m.

Corollary 4.1. |Recall(C, R)−Recall(C, R̂)|≤ϵ/m

Proof of Corollary 4.1. By Theorem 4, |Recall(C, S)−Recall(C,Ŝ)|≤1/m for some arbitrary clustering S and a second clustering Ŝ that is equivalent to S but with a single data point belonging to a different cluster. Given a GTR, R, and a corresponding AGTR R̂, the cluster membership of ϵ data points can be sequentially changed in R to obtain R̂. At each step, the recall value can change by at most ±1/m. Therefore, |Recall(C, R)−Recall(C, R̂)|≤ϵ/m.

Corollary 4.2. |Recall(C, D)−Recall(C, R̂)|≤δ/m

Proof of Corollary 4.2.

By Theorem 4, Recall(C, S)−1/m≤Recall(C, Ŝ)≤Recall(C, S)+1/m for some arbitrary clustering S and a second clustering Ŝ that is equivalent to S but with a single data point belonging to a different cluster. Given a ground truth reference label clustering D and a corresponding AGTR R̂, the cluster membership of ϵ data points can be sequentially changed in D to obtain R̂. At each step, the recall value can change by at most ±1/m.

Therefore, |Recall(C, D)−Recall(C, ̂R)|≤δ/m.

Theorems 3 and 4 show that precision and recall can vary by up to ±1/m when the cluster membership of a single data point in the reference clustering is changed. Therefore, if E cluster labels in R̂ are erroneous, the difference between Precision(C, R) and Precision(C, R̂), as well as between Recall(C, R) and Recall(C, ̂R), is at most ±ϵ/m. With proofs of Theorems 3 and 4 and Corollaries 3.1 and 4.1, these relationships require knowledge of the exact value of E, which is impossible to determine without knowing the ground truth reference clustering. Again, this presents a problem because the purpose of an AGTR is to be used when an adequate reference clustering is unavailable. The solution is to select some value ϵ̂ with the assumption that ϵ̂≥ϵ. It is shown that if this belief is true, the bounds on precision, recall, and accuracy are valid.

Proofs of Theorem 5, Theorem 6, and Corollary 6.1 allow the bounds on the precision, recall, and accuracy of a clustering algorithm or a multiclass classifier to be computed without reference labels.

Theorem 5. If ϵ̂≥ϵ then Precision(C, R̂)−ϵ̂/m≤Precision(C, D)

Proof of Theorem 5. By Corollary 3.1, |Precision(C, R)−Precision(C, R̂)| ϵ/m. This can be written as Precision(C, R̂)−ϵ/m≤Precision(C, R). By applying Theorem 1, Precision(C, R̂)−ϵ̂/m≤Precision(C, R̂)−ϵ/m≤Precision(C, R) S Precision(C, D).

Theorem 6. If ϵ̂≥ϵ then Recall(C, R̂)+ϵ̂/m≥Recall(C, D)

Proof of Theorem 6. By Corollary 4.1, |Recall(C, R)−Recall(C, R̂)|≤ϵ/m. This can be written as Recall(C, R̂)+ϵ/m≥Recall(C, R). Therefore, by Theorem 2, Recall(C, R̂)+ϵ̂/m≥Recall(C, R̂)+ϵ/m≥Recall(C, R)≥Recall(C, D).

Corollary 6.1. If ϵ̂≥ϵ then Recall(C, R̂)+ϵ̂/m≥Accuracy(C, D)

Proof of Corollary 6.1. By Corollary 4.1, |Recall(C, R)−Recall(C, R̂)|≤ϵ/m. This can be written as Recall(C, R̂)+ϵ/m≥Recall(C, R). Using Corollary 2.1, Recall(C, R̂)+ϵ̂/m≥Recall(C, R̂)+ϵ/m≥Recall(C, R)≥Accuracy(C, D).

Now that it is proven that it is possible to compute bounds on precision, recall, and accuracy using an AGTR, techniques for constructing an AGTR from a dataset are presented below.

Constructing an AGTR requires applying domain knowledge from a problem space to group data points with a high likelihood of sharing a reference label. Because of the domain knowledge requirement, no single technique can be used for general AGTR construction. Instead, a method for constructing an AGTR is specific to one kind of classification or clustering problem. Some AGTR construction techniques produce more useful evaluation metric bounds than others. Suppose a GTR R constructed by simply assigning every data point to its own singleton cluster. As shown herein, this method will always form a GTR with no errors because each singleton cluster must be the subset of some cluster in the ground truth reference clustering. However, when this GTR is used to compute the precision and recall of the predicted clustering, Precision(C, R)=c/m and Recall (C, R)=1 is obtained, where c is the number of predicted clusters. This GTR will never be useful for evaluation because these metric bounds are uninformative. It has been found that the similarity in composition between an AGTR and the reference clustering strongly influences the tightness or looseness of evaluation metric bounds. Given a ground truth reference clustering D and an AGTR $R^\wedge$, let $\delta$ be the minimum number of data points in $R^\wedge$ whose cluster membership must be changed in order to transform it into D. Using Theorem 3 and Theorem 4, the difference between a metric bound (prior to accounting for $\epsilon^\wedge$) and the true value of that metric is shown to be no greater than $\delta/m$. (See Corollary 3.2 and Corollary 4.2).

Because evaluation metric bounds can deviate by up to $\delta/m$ from the true metric values, AGTRs that have smaller values of $\delta/m$ (e.g., ones that are as similar to the ground truth reference clustering as possible) are preferred. This allows for identifying the following three properties an AGTR must have in order for it to produce meaningful evaluation results: 1) Low false positive rate; 2) Acceptable false negative rate; and 3) Scalable.

Low False Positive Rate

An AGTR construction technique should group data points from different ground truth reference clusters as infrequently as possible. An increased rate of these false positives must be accounted for with a larger value of $\epsilon^\wedge$ to ensure that $\epsilon^\wedge \geq \epsilon$. This is undesirable, since a larger value of $\epsilon^\wedge$ results in looser evaluation metric bounds.

Acceptable False Negative Rate

A method for constructing an AGTR should be effective at grouping together data points with the same ground truth reference label. An AGTR with too many ungrouped data points will have a large value of $\delta$, resulting in loose bounds.

Scalable

Datasets used for constructing an AGTR should be large enough to adequately represent the problem space. A technique for constructing an AGTR must have acceptable performance when applied to a large number of data points.

The evaluation metric bounds from Theorem 5, Theorem 6, and Corollary 6.1 only hold if errors during AGTR construction are accounted for properly, i.e. $\epsilon^\wedge \geq \epsilon$. Determining the approximate error rate of a process used to construct an AGTR can require some guesswork, as a quality reference dataset is presumably unavailable. Domain experts can model their uncertainty about the AGTR construction method's error rate and choose a value of $\epsilon^\wedge$ that they believe exceeds the number of errors with very high confidence.

As long as an AGTR can be constructed from a dataset, that dataset can be used for partial evaluation of a clustering algorithm or multiclass classifier—even if the dataset does not have reference labels. This is notable because it allows larger, more representative datasets without reference labels to be used during the evaluation process. The ability to compute bounds on precision, recall, and accuracy without reference labels is valuable in its own right, but there are other ways in which AGTRs can be used to great effect. A first example is using the bounds from an AGTR as a litmus test for detecting biased evaluation results produced using a substandard reference dataset. A second example is using an AGTR for evaluating modifications to a clustering algorithm or multiclass classifier.

AGTRs can also be used to detect misleading results produced from low quality reference datasets. The following five steps describe an exemplary way for testing suspect evaluation results:

1. Compute the precision, recall, and/or accuracy of a clustering algorithm or a multiclass classifier using a substandard reference dataset $M_1$
2. Obtain C by applying the clustering algorithm or multiclass classifier to a large, diverse dataset $M_2$.
3. Construct an AGTR $R^\wedge$ from the dataset $M_2$ in step 2.
4. Select a value of $\epsilon^\wedge$ that is believed to be greater than the number of errors in $R^\wedge$.
5. Compute Precision(C, $R^\wedge$)−$\epsilon^\wedge$/m and Recall(C, $R^\wedge$)+$\epsilon^\wedge$/m. Test whether all bounds hold for the evaluation results found during step 1.

Note that if testing a multiclass classifier, C is obtained during step 2 by using the classifier to predict the class label for each data point in the dataset $M_2$ and then clustering all data points that share the same predicted class label. Details described herein identify the qualities an ideal AGTR should possess for best evaluation results and explain how to select an appropriate value of $\epsilon^\wedge$ during step 4. Because the dataset $M_2$ used to construct the AGTR during step 3 is larger and more diverse than the reference dataset $M_1$ from step 1, $M_2$ can be assumed to be a better exemplar of the overall problem space than $M_1$. Although the metric bounds found using $M_2$ do not necessarily hold for $M_i$, it would still be irregular for any evaluation results from $M_1$ to violate them. Therefore, if Precision(C, $R^\wedge$)−$\epsilon^\wedge$/m is greater than the precision computed using $M_1$, or if Recall(C, $R^\wedge$)+$\epsilon^\wedge$/m is less than the recall or accuracy computed using $M_1$, it is reasonable to conclude that the evaluation results found using $M_1$ are misleading.

An important component of evaluating cluster methods and classifier methods is the ability to compare methods against each other. Suppose it is desired to determine which of two clustering algorithms has a higher precision, but there is no access to a satisfactory reference dataset. The two methods can be used to predict clusterings C1 and C2 from an unlabeled dataset, wherein an AGTR $R^\wedge$ from the same unlabeled dataset can be constructed. The precision lower bounds of the two clustering algorithms are given by Precision($C_1$, $R^\wedge$)−$\epsilon^\wedge$/m and Precision($C_2$, $R^\wedge$)−$\epsilon^\wedge$/m. Although Theorem 5 can be applied to show Precision($C_1$, $R^\wedge$)−$\epsilon^\wedge$/m≤Precision($C_1$, D) and Precision($C_2$, $R^\wedge$)−$\epsilon^\wedge$/m≤Precision(C2, D), no relationship between Precision(C1, D) and Precision(C2, D) can be proven. Unfortunately, evaluation metric bounds cannot be used to provably determine whether one clustering algorithm or multiclass classifier has a higher precision, recall, or accuracy than another. However, in specific cases, higher evaluation metric bounds may indicate that one method has a higher performance than another. Two conditions must be met in order for this approach to be used. First, the clustering algorithms or classifiers being compared must be intrinsically similar, such as two different versions of the same classifier. Second, one of the clustering algorithms or classifiers must be tested to ensure that changes in performance are strongly correlated to changes in evaluation metric bounds. The steps of the test can be as follows:

1. Obtain C by applying the clustering algorithm or multiclass classifier to a large, diverse dataset M.
2. Construct an AGTR $\hat{R}$ from the dataset M in step 1.
3. Incrementally shuffle the cluster membership of each data point in C.
4. Compute Precision(C, $\hat{R}$)−$\hat{\epsilon}$/m and Recall(C, $\hat{R}$)+$\hat{\epsilon}$/m at regular intervals of the shuffle.
5. Compute correlation between shuffle percentage and the evaluation metric bounds. Test that a strong negative correlation between the two exists.

Step 3 can be performed by randomly sampling a data point in C with no replacement, randomly selecting a cluster in C weighted by the original distribution of cluster sizes, and then assigning the data point to that cluster. The process repeats m times, where m is the number of points in the dataset M, after which the entire clustering has been shuffled. Because the dataset M has high diversity, the probability that a datapoint will be randomly assigned to an incorrect cluster is far greater than the probability that will be is randomly assigned to the correct one. Therefore, shuffling C with this strategy is very likely to produce predicted clusterings that are sequentially worse. Step 5 is performed by computing the Pearson correlation between the shuffle percentage and the evaluation metric bounds. If a very strong negative correlation exists between the two, it can be concluded that small modifications to a clustering algorithm or classifier that improve its performance will be reflected by a higher evaluation metric bounds, and modifications that lower its performance will be reflected by lower bounds.

As mentioned above, a malware family can be a collection of malicious files that are derived from a common source code, related bad actors, similar functions such as means of penetration, types of vulnerabilities exploited, similar objectives, potential severity of harm, type of harm etc.. Developing malware family classifiers is a substantial research area in the field of malware analysis [6]. However, current reference datasets are inadequate for use in accurately evaluating malware family classifiers and can cause biased or inaccurate evaluation results [1]. A major factor contributing to this inadequacy is that obtaining ground truth family labels for malware is extremely time consuming. Although accurately determining the family of a malware sample is difficult, methods for automatically grouping similar malware samples together with low rates of error have been developed. Therefore, the process of evaluating malware clustering algorithms and malware family classifiers can greatly benefit from the AGTR evaluation framework. Disclosed herein are exemplary methods that are used to obtain malware reference labels, the datasets that have historically been used for classifier evaluation, and the issues that cause uncertainty in evaluation results when such approaches are used. The disclosed methods relate to constructing an AGTR from a dataset of malware samples and applying the AGTR evaluation framework with the approaches described herein to a popular malware classifier. The technique described is exemplary only, and thus it is contemplated to be used as a guide for utilizing the AGTR evaluation framework in other clustering and classification problem spaces.

The task of labeling malware data is expensive and error prone, more so than most standard machine learning (ML) applications areas. This forces the task to use reference datasets that are either small and thus non-representative of the large and diverse malware ecosystem, or large but noisily labeled or biased which again limits confidence in a classifier's results. Because of these issues, malware family classification is an ideal problem space for demonstrating the AGTR evaluation framework.

Ideally, a malware reference dataset would be constructed using manual labeling to determine the malware family of each file. Manual analysis is not perfectly accurate, but the error rate is considered sufficiently negligible that labels obtained via manual analysis are considered to have ground truth confidence [7]. As discussed herein, the typical high cost, effort, and time of manual labeling prevents its use for all but very small reference datasets [1]. One approach to mitigate this is cluster labeling, where a dataset is clustered and an exemplar from each cluster is manually labeled. This strategy is highly reliant on the precision of the algorithm used to cluster the reference dataset, which is often custom-made [10, 11]. Furthermore, the scalability of cluster labeling is similarly limited due to the requirement of manual analysis.

For these reasons larger malware reference datasets tend to use antivirus labeling, where an antivirus engine is used to label a corpus. This is easy to implement at scale, but has significant quality issues [12]. Antivirus labels are frequently incomplete, inconsistent or incorrect [13, 14]. Antivirus signatures do not always contain malware family information [7], and different antivirus engines disagree on the names of malware families [15]. Labels from an antivirus engine can take almost a year to stabilize [12], creating a corresponding lag time between data occurrence and label inference. These issues can be partially mitigated by using antivirus majority voting, but aggregating the results of multiple antivirus engines produces unlabeled files due to lack of consensus. This then biases the final dataset to only the "easy" samples that are the least interesting and already known by current tools [2].

The aforementioned labeling issues have a significant impact on the datasets that are available. The largest datasets used in malware classifier and clustering research range from a hundred thousand [7, 10] up to one million samples [16], but are private corpora held by corporations that can afford the construction cost and do not want to give away a competitive advantage. Since the data is not publicly available, the validation of the labeling cannot be replicated or investigated, and in most cases the number of families is not fully specified [7, 10]. The vast majority of publicly available datasets that have been used are less than 12,000 samples in size [11, 17-21]. Of these, MalGenome is the only fully manually labeled corpus, but also the smallest with only 49 families and 1,260 files [22, 23]. The small size and low diversity of publicly available corpora makes it difficult to make generalizable conclusions about the quality of a malware clustering algorithm or classifier. The largest reference dataset in general use is VX Heavens with 271,092 samples, but it contains very old malware, is labeled using only a single antivirus engine, and the history and composition of the dataset is poorly documented [24]. Additional statistics about notable malware reference datasets are listed in Tables 1 and 2.

TABLE 1

Notable Private Malware Reference Datasets

| Name | Sample | Families | Platform | Collection Period |
| --- | --- | --- | --- | --- |
| Malsign | 142,513 | ? | Windows | 2012-2014 |
| MaLabel | 115,157 | ? | Windows | Apr 2015 or earlier |
| MtNet | 1.3 million | 98 | Windows | Jun 2016 or earlier |

TABLE 2

Notable Public Malware Reference Datasets

| Name | Sample | Families | Platform | Collection Period |
|---|---|---|---|---|
| VX Heavens | 271,092 | 137 | Windows | ? |
| Malheur | 3,133 | 24 | Windows | 2006-2009 |
| Mal Genome | 1,260 | 49 | Android | Aug 2010-Oct 2011 |
| Drebin | 5,560 | 179 | Android | Aug 2010-Oct 2012 |
| Malicia | 11,363 | 55 | Windows | Mar 2012-Mar 2013 |
| Kaggle | 10,868 | 9 | Windows | Feb 2015 or earlier |

Given the issues in curating these reference datasets, three common traits can be identified that negatively impact evaluation: 1) Reference labels without ground truth confidence; 2) Insufficient size or diversity of reference datasets; and 3) Outdated malware reference datasets. All of the reference datasets identified above possess one or more of these negative characteristics.

1) Reference Labels Without Ground Truth Confidence

Because producing ground truth reference labels for a large corpus of malware samples is infeasible, it is common practice to use malware reference labels without ground truth confidence [1]. Many prior malware classifiers have been evaluated using non-ground truth reference labels without the quality of those labels having been assessed [15], which may result in overoptimistic or misleading results [2].

2) Insufficient Size Or Diversity

Due to the enormous number of malware families in existence, malware reference datasets must be both large and diverse in order to be representative of the malware ecosystem. Using a reference dataset with a small number, or imbalanced set, of families lowers the precision, recall, and accuracy of evaluation results [2].

3) Outdated Malware Samples

The ecosystem of malware is constantly changing as categories of malware, malware families, and other tradecraft rise to prominence or fall out of favor. Evaluating a clustering algorithm or multiclass classifier using a reference dataset of outdated malware may produce results that do not translate to present day malware. Each of the reference datasets referenced above does not contain malware samples from after 2015, thus failing to reflect the last half decade of malware evolution and development.

The following discussion relates to a method for constructing an AGTR from a dataset of malware samples. Because the method is automatic and scalable, the resulting AGTR can be orders of magnitude larger than a ground truth malware reference dataset and can include modern malware samples. The exemplary method for constructing an AGTR from a malware dataset is based on peHash, a metadata hash for files in the Portable Executable (PE) format. Files in the PE format are executable files, such as .exe, .dll, and .sys files, that can run on the Windows operating system. peHash was designed for identifying polymorphic malware samples within the same family as well as nearly identical malware samples. The hash digest is computed using metadata from the PE file header, PE optional header, and each PE section header [25]. Two malware samples with identical values for all of the chosen metadata features have identical peHash digests. Due to the number of metadata features used in the hash and the large range of possible values that these features can have, the odds that two unrelated malware samples share a peHash digest is minuscule.

The exemplary method for constructing an AGTR from a Windows malware dataset requires computing the peHash digest of each malware sample. Then, all malware samples that share a peHash digest are assigned to the same cluster. If the peHash of a malware sample cannot be computed, such as due to malformed PE headers, it is assigned to a singleton cluster. Using a hash table to tabulate clusters allows an AGTR to be built very efficiently, requiring only (m) memory usage and (m) run time complexity, where m is the number of malware samples in the dataset.

Wicherski [25] evaluated the false positive rate of peHash using 184,538 malware samples from the mwcollect Alliance dataset and 90,105 malware samples in a dataset provided by Arbor Networks. All malware samples were labeled using the ClamAV antivirus engine [26]. The peHash of each malware sample in each dataset was calculated, resulting in 10,937 clusters for the mwcollect Alliance dataset and 21,343 clusters for the Arbor Networks dataset. Of these clusters, 282 and 322 had conflicting antivirus labels respectively. However, manual analysis showed that none of the clusters with conflicting antivirus labels contained unrelated malware samples. The evaluation method Wicherski used does not rule out the possibility of false positives. However, it is evident that the false positive rate of peHash is extremely low. Based on Wicherski's evaluation and the inventors' own additional assessment, it is suggested to choose a $\hat{\epsilon}$ of approximately one percent the total dataset size when using a pe-Hash AGTR. It is believed that this value should far exceed the true number of errors $\epsilon$ in the AGTR.

peHash is widely regarded to have an extremely low false positive rate. Furthermore, due to the adversarial nature of the malware ecosystem, Wicherski [25] has already analyzed peHash's vulnerabilities, and its widespread usage in industry means practitioners are aware of the real-world occurrence of attacks against it. These factors led the inventors to be very confident in the assessment of peHash's error rate. It was for these reasons, the inventors elected to use peHash rather than design a custom AGTR construction technique.

The following discussion relates to applying the AGTR evaluation framework to the malware labeling tool AVclass [15]. When provided an antivirus scan report for a malware sample, AVClass attempts to aggregate the many antivirus signatures in the report into a single family label. AVClass is open source, simple to use, and does not require the malware sample to obtain a label, making it a popular choice as a malware classifier since its release in 2016. Presented herein is evidence of overfitting in the original AVClass evaluation results due to the use of poor reference data. Also demonstrated is the ability to compare modified versions of classifiers using an AGTR by making minor modifications to AVClass and assessing their benefits or drawbacks. Evaluating such nuanced modifications was not previously tenable due to the lack of large reference datasets. The ability to compare the impact of method adjustments immediately that are otherwise hard to detect is of significant value in this domain, as production changes usually require months to obtain customer feedback or through "phantom" deployments (e.g., a new method is deployed alongside a previous method, but the new results are recorded for evaluation and comparison).

Sebastian et al. [15] evaluated AVClass using five malware reference datasets. Because security vendors frequently refer to malware families by different names, the family names used by AVClass do not match those used by the reference datasets. Therefore, although AVClass is a classifier, Sebastian et al. could not compute its accuracy and chose to use precision and recall instead.

Precision and recall scores for the default version of AVClass are shown in Table 3.

TABLE 3

AVClass Evaluation

| Dataset | Precision | Recall |
|---|---|---|
| Drebin | 0.954 | 0.844 |
| Malicia | 0.949 | 0.680 |
| Mal sign | 0.904 | 0.907 |
| Mal Genome* | 0.879 | 0.933 |
| Malheur | 0.904 | 0.983 |

The row entitled MalGenome* is a modified version of the MalGenome dataset where labels for six variants of the Droid-KungFu family are corrected. Attention is called to the high variation in evaluation results—the precision of AVClass ranges from 0.879 to 0.954 and its recall ranges from 0.680 to 0.983. It is clear that due to these inconsistencies the evaluation results for AVClass are already suspect. To confirm this, the evaluation results of AVClass were tested using methods described herein.

A portion of the VirusShare dataset [27] was used to construct an AGTR. The full VirusShare corpus contains 37,171,547 unlabeled malware samples dated between June 2012 and the time of writing. The VirusShare dataset is broken into chunks, and new chunks are added to the dataset regularly. Antivirus scan reports for chunks 0-7 of the VirusShare corpus, which consists of 1,048,567 malware samples [28], were used. These scans were collected between December 2015 and May 2016 by querying the VirusTotal API [29]. AVClass was run under default settings to obtain predicted family labels from each scan report. A predicted clustering C was produced by assigning all malware samples with the same AVClass label to the same cluster. Malware samples for which no label could be determined were assigned to a singleton cluster. Next, peHash was used to form an AGTR $R\hat{}$ from VirusShare chunks 0-7. $e\hat{}=10,000$ was selected for the AGTR, which allows for an error rate of up to approximately one percent during the AGTR construction process.

Table 4 shows the values of Precision(C, $R\hat{}$)−$\epsilon\hat{}$/m and Recall(C, $R\hat{}$)+$\epsilon\hat{}$/m for the peHash AGTR constructed using chunks 0-7 of the VirusShare dataset.

TABLE 4

AVClass Bounds

| Precision Lower Bound | 0.299 |
|---|---|
| Recall Upper Bound | 0.895 |

AVClass has an accuracy no greater than 0.895. The precision lower bound of 0.229 seems to be very loose considering that the smallest precision in Table 4 is 0.879. This can be attributed to the moderate false negative rate of peHash; an AGTR construction technique that is better able to group data points should yield a tighter bound. The similarity between the recall upper bound and the reported recall results shows that, although the peHash AGTR could be improved, the bounds are non-trivial. The Malsign, MalGenome, and Malheur datasets in Table 3 all have recall values exceeding the upper bound found using the peHash AGTR; the values for MalGenome and Malheur significantly so. Because VirusShare chunks 0-7, containing over a million malware samples from thousands of families, is significantly larger and more diverse than the Malsign, MalGenome, and Malheur datasets, it is believed that evaluation results produced using those datasets are overfit to the labeling difficulties discussed above.

Figure 3:
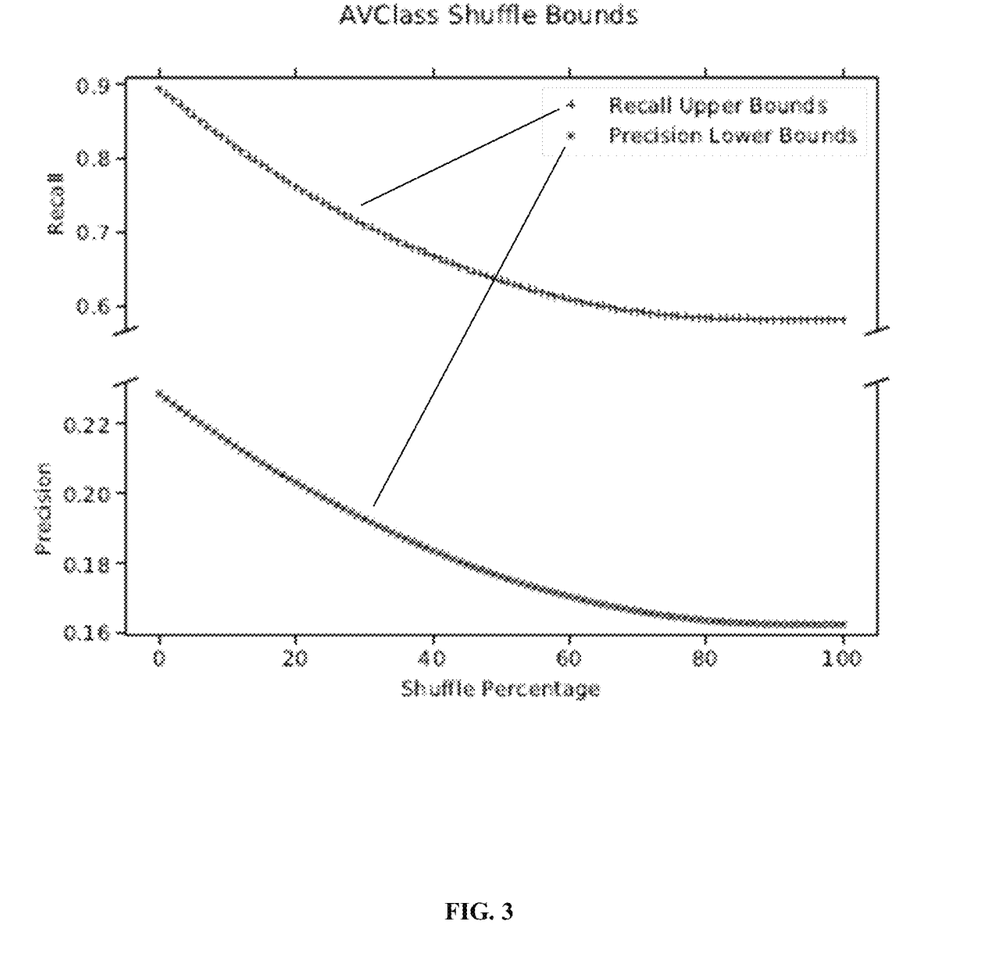
FIG. 3 shows precision and recall bounds of AVClass with respect to shuffle percentage.

FIG. 3 shows precision and recall bounds of AVClass with respect to shuffle percentage. The x-axis of each figure shows the percentage of data points whose cluster membership has been shuffled. The y-axis of each figure shows the value of the metric bound. As the shuffle percentage increases, the bounds adjust monotonically and at a near linear rate, slowing only after 80% corruption.

Table 5 shows the correlation between evaluation metric bounds and percent of labels shuffled. The strong negative correlation shows that bounds track directly with cluster noise.

TABLE 5

Correlation Between Evaluation Metric
Bounds and Percent of Labels Shuffled

| | Pearson correlation | P-value |
|---|---|---|
| Precision Lower Bounds | −0.956 | 2.583e−54 |
| Recall Upper Bounds | −0.940 | 5.535e−48 |

The following discussion shows that a peHash AGTR can be used to determine whether modifications to AVClass make a positive or negative impact on performance. In order to compare clustering algorithms or classifiers using an AGTR, they must meet the two conditions discussed above. Because AVClass is being compared to slightly modified versions of itself, the classifiers are similar enough that the first condition is met. For the second step, it must be determine whether changes in classifier performance are strongly correlated with the evaluation metric bounds. To perform this check, the same predicted clustering C and AGTR $R\hat{}$ used earlier are used.

Next, C is incrementally shuffled, and the precision and recall bounds are computed each time that an additional one percent of the data points have been shuffled. FIG. 3 shows how the bounds change as the data points are shuffled. It is evident that both bounds worsen predictably and monotonically as the data points are shuffled. Table 5 shows that there is a high negative correlation between the shuffle percentage and the values of the evaluation metric bounds. The extremely low p-values indicate that these results are statistically significant. Since a higher shuffle percentage indicates a worse clustering, there is likely a strong connection between the bounds and the true metric values. Because these two conditions have been met, it can be concluded that it is valid to compare modified versions of AVClass using the AGTR evaluation framework.

Next, a comparison of modified versions of AVClass to the original tool is performed. The purpose of this exercise is to demonstrate that an AGTR can be used to quantify the relative benefits and trade-offs of each of these changes to AVClass in the absence of reference data.

It is common for different antivirus engines to refer to the same family of malware by different names. Two names for the same malware family can be referred to as aliases of each other. One of the steps that AVClass performs while aggregating antivirus signatures is resolution of family aliases [15]. If aliases are not resolved properly, AVClass could produce erroneous labels. By default, AVClass uses a manually generated list of known aliases. AVClass also has a setting for generating a family alias map based on families that have a high co-occurrence percentage within a corpus of antivirus scan results. Generation of the family alias map is controlled by the parameters nalias, which is the minimum number of malware samples two tokens must appear in together, and Talias, which is the minimum co-occurrence percentage. To investigate how alias replacement affects label quality, AVClass is provided with three different family alias maps and is used to label VirusShare chunks 0-7. The first map is the one packaged within AVClass that is used by default. A second map is generated using parameter values nalias=20 and Talias=0.94, which were chosen empirically by Sebastian et al [15]. The third map was generated using the stricter parameter values nalias=100 and Talias=0.98 listed in the AVClass documentation.

TABLE 6

AVClass Alias Resolution Bounds

| Alias Preparation | Manual | Recommended | Strict |
|---|---|---|---|
| Precision Lower Bound | 0.229 | 0.230 | 0.233 |
| Recall Upper Bound | 0.895 | 0.897 | 0.894 |

Table 6 shows the evaluation metric bounds for AVClass using the three family alias maps. Generating a map using the recommended parameters yields both higher precision and recall bounds than the default one. Generating a family alias map using the stricter parameters results in the highest precision bound but the lowest recall bound. All bounds are very similar, so none of the family alias maps appear to be significantly better than the others.

For the next modification, a plurality threshold is added to AVClass. By default, AVClass determines the label of a malware sample by selecting the plurality family proposed by the antivirus engines in a scan report [15]. Rather than using simple plurality voting to determine the label, AVClass is modified to require that the number of votes for the plurality family exceeds the number of votes for any other family by a given threshold. For example, if the plurality threshold is two, the plurality family must receive at least two more votes than any other family. If no family meets this condition, AVClass outputs no label for that sample. The modified version of AVClass is used to label VirusShare chunks 0-7 with plurality thresholds between 0 and 5.

Table 7 displays the precision and recall bounds of AVClass using different plurality thresholds.

TABLE 7

AVClass Plurality Threshold Bounds

| Threshold | 0 | 1 | 2 | 3 | 4 | 5 |
|---|---|---|---|---|---|---|
| Precision Lower Bound | 0.229 | 0.276 | 0.332 | 0.442 | 0.511 | 0.565 |
| Recall Upper Bound | 0.895 | 0.881 | 0.860 | 0.829 | 0.803 | 0.780 |

Note that a plurality threshold of zero is equivalent to the default version of AVClass. As the plurality threshold is raised, the precision lower bound significantly increases, indicating that higher thresholds reduce the number of false positives. However, raising the plurality threshold creates a trade-off, as it causes the recall (and hence accuracy) upper bounds to decrease to a lesser degree. This is largely due to the growing number of unlabeled malware samples contributing to the false negative rate. Thresholds above three may be useful for classifiers that require a very high precision. A threshold of one or two may offer a higher precision than the default version of AVClass without sacrificing a significant amount of recall. Since different applications of malware classification may require either a low false positive rate or a low false negative rate, the findings indicate how designers of malware classifiers can adopt a suitable voting strategy.

When normalizing an antivirus signature, AVClass treats each token within the signature independently. However, incorporating contextual information from each token can improve AVClass' labeling decisions. A simple example of this is using context from tokens that indicate that the antivirus signature is a "heuristic." Heuristic signatures are more likely to include inaccurate family information. To test this, eight tokens are identified that indicate that an antivirus signature is a heuristic. AVClass is modified to identify antivirus signatures containing one of the tokens listed in Table 8 and not count those signatures towards the plurality vote.

TABLE 8

Heuristic Antivirus Signature Tokens

| gen | heur | el dorado | behaveslike |
|---|---|---|---|
| generic | heuristic | variant | lookslike |

Table 9 shows the evaluation metric bounds for the default version of AVClass and the modified version of AVClass where heuristic antivirus signatures are not counted towards the plurality vote. Simply ignoring common heuristic antivirus signatures substantially raises the precision bound of AVClass from 0.229 to 0.250. This comes at the cost of a minor increase in false negatives, as indicated by the slight drop in the recall bound. This confirms suspicions that heuristic antivirus signatures often contain inaccurate family information. A more sophisticated method for handling heuristic signatures could offer even further improvements to AVClass.

TABLE 9

AVClass Heuristic Signature Removal Bounds

| Heuristic Signature Removal | No | Yes |
|---|---|---|
| Precision Lower Bound | 0.229 | 0.250 |
| Recall Upper Bound | 0.895 | 0.889 |

The references identified below are incorporated herein in their entirety.

[1] R. Perdisci and M. U, "*Vamo: Towards a fully automated malware clustering validity analysis,*" 12 2012, pp. 329-338.

[2] P. Li, L. Liu, D. Gao, and M. K. Reiter, "*On challenges in evaluating malware clustering,*" in Recent Advances in Intrusion Detection, S. Jha, R. Sommer, and C. Kreibich, Eds., 2010, pp. 238-255.

[3] A. Kent, M. M. Berry, F. U. Luehrs Jr., and J. W. Perry, "Machine literature searching viii. operational criteria for designing information retrieval systems," American Documentation, vol. 6, no. 2, pp. 93-101, 1955.

[4] U. Bayer, P. M. Comparetti, C. Hlauschek, C. Kruegel, and E. Kirda, "*Scalable, behavior-based malware clustering,*" in NDSS 2009, 16th Annual Network and Distributed System Security Symposium, 02 2009. [Online]. Available: http://www.eurecom.fr/publication/2783

[5] R. Paige and R. E. Tarjan, "*Three partition refinement algorithms,*" SIAM Journal on Computing, vol. 16, no. 6, pp. 973-989, 1987.

[6] E. Raff and C. Nicholas, "*A Survey of Machine Learning Methods and Challenges for Windows Malware Classifi-* cation," in NeurIPS 2020 Workshop: ML Retrospectives, Surveys & Meta-Analyses (ML-RSA), 2020.

[7] A. Mohaisen, O. Alrawi, and M. Mohaisen, "Amal: High-fidelity, behavior-based automated malware analysis and classification," Computers & Security, vol. 52, pp. 251-266, 2015. [Online]. Available: http://www.sciencedirect.com/science/article/pii/S0167404815000425

[8] A. Mohaisen and O. Alrawi, "*Unveiling zeus: Automated classification of malware samples*," in Proceedings of the 22nd International Conference on World Wide Web, ser. WWW '13 Companion. New York, NY, USA: Association for Computing Machinery, 2013, p. 829-832. [Online]. Available: https://doi.org/10.1145/2487788.2488056

[9] D. Votipka, S. Rabin, K. Micinski, J. S. Foster, and M. L. Mazurek, "An Observational Investigation of Reverse Engineers' Process and Mental Models," in Extended Abstracts of the 2019 CHI Conference on Human Factors in Computing Systems, 2019.

[10] P. Kotzias, S. Matic, R. Rivera, and J. Caballero, "Certified pup: Abuse in authenticode code signing," in CCS '15, 2015.

[11] A. Nappa, M. Z. Rafique, and J. Caballero, "*The malicia dataset: identification and analysis of drive-by download operations*," International Journal of Information Security, vol. 14, no. 1, pp. 15-33, 2015. [Online]. Available: https://*doi.org*/10.1007/s10207-014-0248-7

[12] S. Zhu, J. Shi, L. Yang, B. Qin, Z. Zhang, L. Song, and G. Wang, "*Measuring and modeling the label dynamics of online anti-malware engines*," in 29$^{th}$ USENIX Security Symposium (USENIX Security 20). Boston, MA: USENIX Association, Aug. 2020. [Online]. Available: https://www.usenix.org/conference/usenixsecurity20/presentation/zhu

[13] M. Botacin, F. Ceschin, P. de Geus, and A. Grégio, "*We need to talk about antiviruses: challenges & pitfalls of av evaluations*," Computers & Security, vol. 95, p. 101859, 2020. [Online]. Available: http://www.sciencedirect.com/science/article/pii/S0167404820301310

[14] A. Mohaisen, O. Alrawi, M. Larson, and D. McPherson, "Towards a methodical evaluation of antivirus scans and labels," in Information Security Applications, Y. Kim, H. Lee, and A. Perrig, Eds. Cham: Springer International Publishing, 2014, pp. 231-241.

[15] M. Sebastián, R. Rivera, P. Kotzias, and J. Caballero, "*Avclass: A tool for massive malware labeling*," in Research in Attacks, Intrusions, and Defenses, F. Monrose, M. Dacier, G. Blanc, and J. Garcia-Alfaro, Eds. Cham: Springer International Publishing, 2016, pp. 230-253.

[16] W. Huang and J. Stokes, "*Mtnet: A multi-task neural network for dynamic malware classification*," 07 2016, pp. 399-418.

[17] K. Rieck, "Malheur dataset," https://www.sec.cs.tu-bs.de/data/malheur/, Last accessed on 2020-3-9.

[18] K. Rieck, P. Trinius, C. Willems, and T. Holz, "*Automatic analysis of malware behavior using machine learning*," Journal of Computer Security, vol. 19, pp. 639-668, 2011.

[19] D. Arp, "The drebin dataset," https://www.sec.cs.tu-bs.de/~danarp/drebin/download.html, Last accessed on 2020-3-9.

[20] D. Arp, M. Spreitzenbarth, M. Hübner, H. Gascon, and K. Rieck, "*Drebin: Effective and explainable detection of android malware in your pocket*," 02 2014.

[21] R. Ronen, M. Radu, C. Feuerstein, E. Yom-Tov, and M. Ahmadi, "*Microsoft malware classification challenge*," CoRR, vol. abs/1802.10135, 2018. [Online]. Available: http://arxiv.org/abs/1802.10135

[22] Y. Zhou, "Malgenome project," http://malgenomeproject.org/, Last accessed on 2020-3-9.

[23] Y. Zhou and X. Jiang, "*Dissecting android malware: Characterization and evolution*," in 2012 IEEE Symposium on Security and Privacy, May 2012, pp. 95-109.

[24] Y. Qiao, X. Yun, and Y. Zhang, "How to automatically identify the homology of different malware," in 2016 IEEE Trustcom/BigDataSE/ISPA, Aug 2016, pp. 929-936.

[25] G. Wicherski, "*pehash: A novel approach to fast malware clustering*," in LEET, 2009.

[26] "Clamav," http://anubis.iseclab.org/, Last accessed on 2020-5-04.

[27] "Virusshare.com—because sharing is caring," https://virusshare.com/, Last accessed on 2021-1-25.

[28] J. Seymour, "Bsidesly 2016: Labeling the virusshare corpus-lessons learned," 2016, bSides Las Vegas. [Online]. Available: https://www.peerlyst.com/posts/bside-slv-2016-labeling-the-virusshare-corpus-lessons-learned-iohn-seymour

[29] VirusTotal, "File statistics during last 7 days," https://www.virustotal.com/en/statistics/, Last accessed on 2020-3-8.

It will be understood that modifications to the embodiments disclosed herein can be made to meet a particular set of design criteria. For instance, any of the component of the apparatuses disclosed herein can be any suitable number or type of each to meet a particular objective. Therefore, while certain exemplary embodiments of the apparatuses and methods of making and using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A method for malware classifier evaluation, the method comprising:
   deriving, using a processor, a collection of malware samples;
   constructing, using the processor, a ground truth refinement from a reference dataset comprising the malware samples, the ground truth refinement having a degree of error within specified bounds from the reference dataset as an approximate ground truth refinement, wherein:
the reference dataset includes at least some data without a reference label; and
a reference label or any data in the dataset is a label a classifier is expected to predict;
determining, using the processor:
a lower bound on precision using the approximate ground truth refinement; and
an upper bound on recall and accuracy using the approximate ground truth refinement;
evaluating, using the processor, the classifier for at least one task of a classification method or a clustering method by examining changes to the upper bound or changes to the lower bound produced by the approximate ground truth refinement, wherein the evaluation is performed without having to use a reference label or at least some data in the reference dataset; and
detecting, using the processor, biased or misleading evaluation results caused by the classifier method or clustering method.

2. The method of claim 1, comprising:
altering, using the processor, parameters of the classification method or the clustering method of the classifier by examining changes to the upper bound on recall, changes to the upper bound on accuracy, or changes to the lower bound on precision produced by the approximate ground truth refinement.

3. The method of claim 1, comprising:
refining, using the processor, predictions of the classification method or the clustering method using the approximate ground truth refinement to improve accuracy, precision, and/or recall of the classification method or the clustering method.

4. The method of claim 1, comprising:
computing, using the processor, a metadata hash digest of at least two malware dataset samples;
assigning, using the processor, to a same malware cluster all malware samples of the at least two malware samples that share a metadata hash digest;
assigning, using the processor, to a singleton cluster, each malware sample of the at least two malware samples for which the metadata hash digest cannot be computed.

5. The method of claim 4, wherein:
the metadata hash is a peHash.

6. A method for improving a malware classifier for an input data file, the method comprising:
deriving, using a processor, a collection of malware samples;
constructing, using the processor, a ground truth refinement from a reference dataset comprising the malware samples, the ground truth refinement having a degree of error within specified bounds from the reference dataset as an approximate ground truth refinement, wherein:
the reference dataset includes at least some data without a reference label; and a reference label or any data in the dataset is a label a classifier is expected to predict;
determining, using the processor:
a lower bound on precision using the approximate ground truth refinement; and
an upper bound on recall and accuracy using the approximate ground truth refinement;
evaluating, using the processor, the classifier for at least one task of a classification method or clustering method by examining changes to the upper bound or changes to the lower bound produced by the approximate ground truth refinement, wherein the evaluation is performed without having to use a reference label or at least some data in the reference dataset;
classifying, using the processor, an input data file using the classifier evaluated by the approximate ground truth refinement having the upper bound and the lower bound;
detecting, using the processor, biased or misleading evaluation results caused by the classifier method or the clustering method; and
at least one of, using the processor: altering parameters of the classification method or the clustering method used by the classifier; or refining predictions of the classification method or the clustering method used by the classifier.

7. The method according to claim 6, comprising:
classifying, using the processor, the input data file as malware being within a known family of malware using the classifier evaluated by the approximate ground truth refinement having the upper bound and the lower bound.

8. The method of claim 6, comprising:
computing, using the processor, a metadata hash digest of at least two malware samples;
assigning to a same malware cluster all malware samples of the at least two malware samples that share a metadata hash digest;
assigning, using the processor, to a singleton cluster, each malware sample of the at least two malware samples for which the metadata hash digest cannot be computed.

9. The method of claim 8, wherein
the metadata hash is a peHash.

10. An apparatus for evaluating a malware classifier, the apparatus comprising:
a classifier for classifying an input data file; and
a hardware processor for evaluating the classifier, wherein the hardware processor includes memory with a computer program which when executed will cause the hardware processor to:
derive a collection of malware samples;
construct a ground truth refinement from a reference dataset comprising the malware samples, the ground truth refinement having a degree of error within specified bounds from a reference dataset as an approximate ground truth refinement, wherein:
the reference data set includes at least some data without a reference label; and
a reference label or any data in the dataset is a label a classifier is expected to predict;
determine:
a lower bound on precision using the approximate ground truth refinement; and
an upper bound on recall and accuracy using the approximate ground truth refinement;
evaluate the classifier for at least one task of a classification method or a clustering method by examining changes to the upper bound or changes to the lower bound produced by the approximate ground truth refinement, wherein the evaluation is performed without having to use a reference label or at least some data in the reference dataset; and
detect biased or misleading evaluation results caused by the classifier method or clustering method.

11. The apparatus of claim 10, wherein:
the computer program which when executed will cause the hardware processor to alter parameters of the classification method or the clustering method of the classifier by examining changes to the upper bound or the lower bound produced by the approximate ground truth refinement.

12. The apparatus of claim 10, wherein:
the computer program which when executed will cause the hardware processor to refine predictions of the classifier method or the clustering method of the classifier using the ground truth refinement to improve accuracy, precision, and/or recall of the classifier method or the clustering method.

13. The apparatus of claim 10, wherein:
the classifier classifies the input data file as malware.

14. A method for malware classifier evaluation, the method comprising:
deriving, using a processor, a collection of malware samples;
constructing, using the processor, a ground truth refinement from a reference dataset comprising the malware samples, the ground truth refinement having a degree of error within specified bounds from the reference dataset as an approximate ground truth refinement, wherein:
the reference dataset includes at least some data without a reference label; and
a reference label or any data in the dataset is a label a classifier is expected to predict;
determining, using the processor:
a lower bound on precision using the approximate ground truth refinement; and
an upper bound on recall and accuracy using the approximate ground truth refinement;
evaluating, using the processor, the classifier for at least one task of a classification method or a clustering method by examining changes to the upper bound or changes to the lower bound produced by the approximate ground truth refinement, wherein the evaluation is performed without having to use a reference label or at least some data in the reference dataset;
detecting, using the processor, biased or misleading evaluation results caused by the classifier method or clustering method;
computing, using the processor, a metadata hash digest of at least two malware dataset samples;
assigning, using the processor, to a same malware cluster all malware samples of the at least two malware samples that share a metadata hash digest; and
assigning, using the processor, to a singleton cluster, each malware sample of the at least two malware samples for which the metadata hash digest cannot be computed.

15. A method for malware classifier evaluation, the method comprising:
deriving, using a processor, a collection of malware samples;
constructing, using the processor, a ground truth refinement from a reference dataset comprising the malware samples, the ground truth refinement having a degree of error within specified bounds from the reference dataset as an approximate ground truth refinement, wherein:
the reference dataset includes at least some data without a reference label; and a reference label or any data in the dataset is a label a classifier is expected to predict;
determining, using the processor:
a lower bound on precision using the approximate ground truth refinement; and
an upper bound on recall and accuracy using the approximate ground truth refinement;
detecting, using the processor, biased or misleading results of a classifier method or a clustering method;
refining, using the processor, predictions of the classifier method or the clustering method using the ground truth refinement to improve accuracy, precision, and/or recall;
computing, using the processor, a metadata hash digest of at least two malware samples;
assigning, using the processor, to a same malware cluster all malware samples of the at least two malware samples that share a metadata hash digest; and
assigning, using the processor, to a singleton cluster, each malware sample of the at least two malware samples for which the metadata hash digest cannot be computed.

16. A method for improving a malware classifier for an input data file, the method comprising:
deriving, using a processor, a collection of malware samples;
constructing, using the processor, a ground truth refinement from a reference dataset comprising the malware samples, the ground truth refinement having a degree of error within specified bounds from a reference dataset as an approximate ground truth refinement, wherein:
the reference dataset includes at least some data without a reference label; and
a reference label or any data in the dataset is a label a classifier is expected to predict;
determining, using the processor:
a lower bound on precision using the approximate ground truth refinement; and
an upper bound on recall and accuracy using the approximate ground truth refinement;
evaluating, using the processor, the classifier for at least one task of a classification method or clustering method by examining changes to the upper bound or changes to the lower bound produced by the approximate ground truth refinement, wherein the evaluation is performed without having to use a reference label or at least some data in the reference dataset;
classifying, using the processor, an input data file using the classifier evaluated by the approximate ground truth refinement having the upper bound and the lower bound;
detecting, using the processor, biased or misleading evaluation results caused by the classifier method or the clustering method;
at least one of, using the processor: altering parameters of the classification method or the clustering method used by the classifier; or refining predictions of the classification method or the clustering method used by the classifier;
computing, using the processor, a metadata hash digest of at least two malware samples;
assigning, using the processor, to a same malware cluster all malware samples of the at least two malware samples that share a metadata hash digest; and
assigning, using the processor, to a singleton cluster, each malware sample of the at least two malware samples for which the metadata hash digest cannot be computed.

17. An apparatus for evaluating a malware classifier, the apparatus comprising:
a classifier for classifying an input data file; and
a hardware processor for evaluating the classifier, wherein the hardware processor includes memory with a computer program which when executed will cause the hardware processor to:
derive a collection of malware samples;
construct a ground truth refinement from a reference dataset comprising the malware samples, the ground truth refinement having a degree of error within specified bounds from a reference dataset as an approximate ground truth refinement, wherein:
the reference dataset includes at least some data without a reference label; and
a reference label or any data in the dataset is a label a classifier is expected to predict;
determine:
a lower bound on precision using the approximate ground truth refinement; and
an upper bound on recall and accuracy using the approximate ground truth refinement;
evaluate the classifier for at least one task of a classification method or a clustering method by examining changes to the upper bound or changes to the lower bound produced by the approximate ground truth refinement, wherein the evaluation is performed without having to use a reference label or at least some data in the reference dataset;
detect biased or misleading evaluation results caused by the classifier method or clustering method;
compute a metadata hash digest of at least two malware samples;
assign to a same malware cluster all malware samples of the at least two malware samples that share a metadata hash digest; and
assign to a singleton cluster, each malware sample of the at least two malware samples for which the metadata hash digest cannot be computed.

* * * * *